United States Patent [19]

Schaale

[11] 4,200,514
[45] Apr. 29, 1980

[54] METHOD AND APPARATUS FOR THE ALIGNING AND INSTALLATION OF WICKET GATE BUSHINGS IN A UNITIZED STAY RING-DISCHARGE RING OF A HYDRO-TURBINE MACHINE

[75] Inventor: Robert G. Schaale, York, Pa.

[73] Assignee: Allis-Chalmers Corporation, Milwaukee, Wis.

[21] Appl. No.: 969,240

[22] Filed: Dec. 13, 1978

[51] Int. Cl.² ............................ B29C 5/00; B29D 3/00
[52] U.S. Cl. ......................................... 264/262; 29/271;
  164/98; 164/108; 164/112; 164/332; 228/49 R;
  249/88; 249/91; 249/177; 264/267; 264/278
[58] Field of Search ............... 264/262, 242, 275, 277,
  264/267, 156, 278, 269; 249/91, 93, 177, 180,
  83, 88, 96, 97; 269/7; 228/49 R; 29/281.5,
  281.6, 282, 272, 271, 460, 464, 468, 149.5 NM;
  164/98, 108, 112, 332, 333

[56] References Cited

U.S. PATENT DOCUMENTS

| | | | |
|---|---|---|---|
| 3,224,076 | 12/1965 | Johnson et al. | 264/277 |
| 3,540,314 | 11/1970 | Howard | 264/242 |
| 3,725,993 | 4/1973 | Siler | 29/271 |
| 3,999,279 | 12/1976 | O'Neal et al. | 264/267 |

*Primary Examiner*—W. E. Hoag
*Attorney, Agent, or Firm*—Robert C. Jones

[57] ABSTRACT

Bushing and sleeve assembly are attached in an alignment fixture and placed in the stay ring-discharge ring. An internal pilot bearing is placed in the headcover to accommodate an aligning bar which is lowered through the headcover and pilot. The lower end of the aligning bar is engaged with the aligning fixture and the pilot can then be engaged with the headcover to automatically align the bushing and sleeve assembly with the two headcover bushings at the upper bearing pilot and the internal intermediate pilot.

7 Claims, 2 Drawing Figures

METHOD AND APPARATUS FOR THE ALIGNING AND INSTALLATION OF WICKET GATE BUSHINGS IN A UNITIZED STAY RING-DISCHARGE RING OF A HYDRO-TURBINE MACHINE

This invention relates in general to hydraulic turbines and more particularly to installation of wicket gates in a unitized stay ring-discharge ring. This invention is more specifically directed to the aligning and installation of the lower gate stem bushings in a unitized stay ring-discharge ring of the turbine.

BACKGROUND OF THE INVENTION

In many types of hydraulic turbines the various components are fabricated as individual units. This permits shop assembly in stages or even field assembly in stages. However, in the larger size of turbines wherein unitized construction is utilized to reduce cost and increase the strength of the components, difficulty has been experienced in installing the lower gate stem bushing so as to provide true alignment for the wicket gate stem or shaft. In the past, the bushings were installed in the shop in holes machined in a separate bottom, independent bottom ring or in the discharge ring. This operation requires a boring fixture or template to locate the holes accurately.

However, in the large sizes of turbines, the components are fabricated in sections and assembled in the field. Also, unitized construction is introduced to increase the structural strength of the machine and also to reduce the cost of manufacturing. Thus, unitized stay ring-discharge ring is assembled in the field and encased in the concrete structure prior to the other components. This, of course, creates problems, especially where a plurality of holes are to be provided which holes must be in alignment.

It is a general object of the present invention to provide a method and apparatus for aligning and installing wicket gate bushings in a unitized stay ring-discharge ring.

Yet another object of the present invention is to provide a method and apparatus for accomplishing the field alignment and installation of lower gate stem bushings in a unitized stay ring-discharge ring of a hydraulic turbine machine.

Still another object of the present invention is to provide a method and apparatus for the field alignment and installation of wicket gate stem bushings that do not require the provision and use of expensive boring fixtures or templates.

A further object of the present invention is to provide a method and apparatus which allows the utilization of unitized stay ring-discharge ring construction wherein the bearing holes for the stems of the wicket gates may be cut in the shop without the necessity of a fixture and the plurality of wicket gate bearings can be field installed with substantially perfect alignment.

DESCRIPTION OF THE INVENTION

Figure 1:
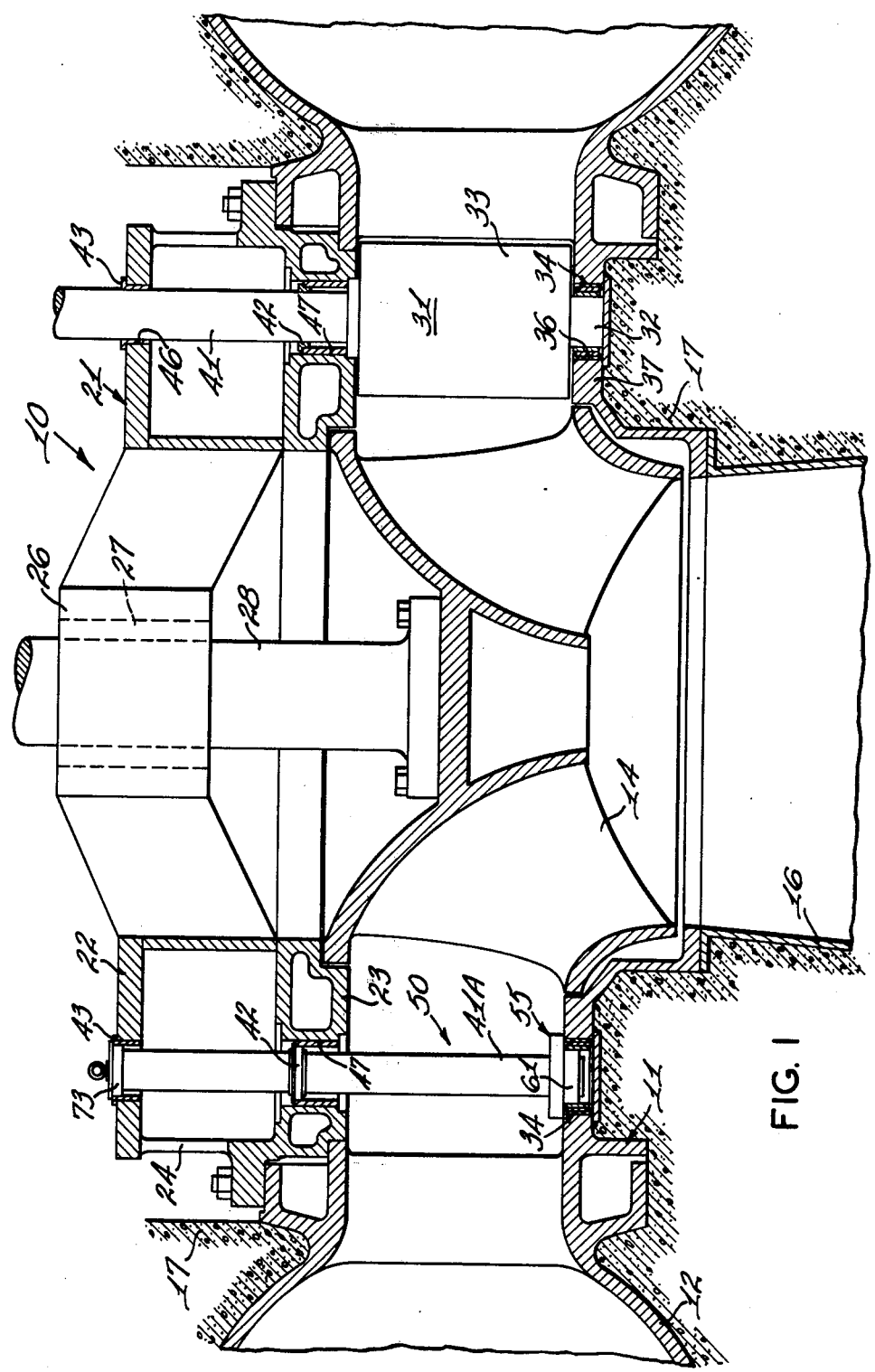
FIG. 1 is a view in vertical section of a portion of a hydraulic turbine machine showing the unitized stay ring-discharge ring showing an installed wicket gate and also the apparatus for aligning the wicket gate bearings; and, FIG. 2 is an enlarged view of the apparatus for the alignment and installation of wicket gate stem bushings.

Referring to FIG. 1, the portion of a hydraulic turbine machine 10 illustrated therein, discloses a unitized stay ring-discharge ring 11. To the unitized stay ring-discharge ring 11 there is welded a spiral case 12 through which the water stream flows to the runner 14 and thence through the draft tube 16. The unitized stay ring-discharge ring 11 and the spiral case 12 is encased in the concrete foundation 17 of the powerhouse prior to the other components of the turbine being assembled thereto at a later time. Because of its size and the forces it must withstand, the headcover 21 is a fabricated member comprising upper and lower horizontally disposed plate or deck members 22 and 23, respectively. The upper and lower members are rigidly joined together by means of a cylindrical sidewall 24. A vertically disposed central bearing-housing 26 reinforces the headcover assembly 21 and carries a turbine shaft bearing 27 in which the turbine shaft 28 is journalled.

The turbine 10 includes a plurality of wicket gates 31, one of which is shown, which operate to control the flow of water through the turbine. As shown, each wicket gate 31 includes a stub shaft or stem 32 at the lower end of the wicket gate blade 33. This stub shaft 32 is journalled in a bearing 34 mounted in an opening 36 formed in the bottom ring 37 of unitized stay ring-discharge ring 11.

An elongated shaft or upper stem 41 is connected to the upper end of the wicket gate blade 33. As shown, the stem 41 extends through both decks 23 and 22 of the headcover assembly 21. An operating mechanism (not shown) is operably connected to the upper extension of stem 41 in a well known manner to effect the positioning movement of the gates. To support the upper stem 41 there is provided an intermediate support assembly 42 and an upper support assembly 43. The support assembly 43 is disposed within an opening 46 formed in the upper deck and cut therein in the shop when fabricating the headcover assembly 21. Similarly, the intermediate support assembly 42 is likewise disposed in an opening 47 cut in the lower deck 23 which is also formed in the shop at time of fabricating the headcover. In the same manner, the bearing 34 is located within an opening 36 cut in the unitized stay ring-discharge ring 11.

Since openings 46, 47 and 36 are all cut in the shop during fabrication of the components, a problem of aligning the supporting assemblies 43 and 42 and the bearing 34 is presented. This is true for every wicket gate assembly of which there are 28. It is apparent, therefore, that to provide expensive boring fixtures for field installation would be a prohibitive cost factor.

Figure 2:
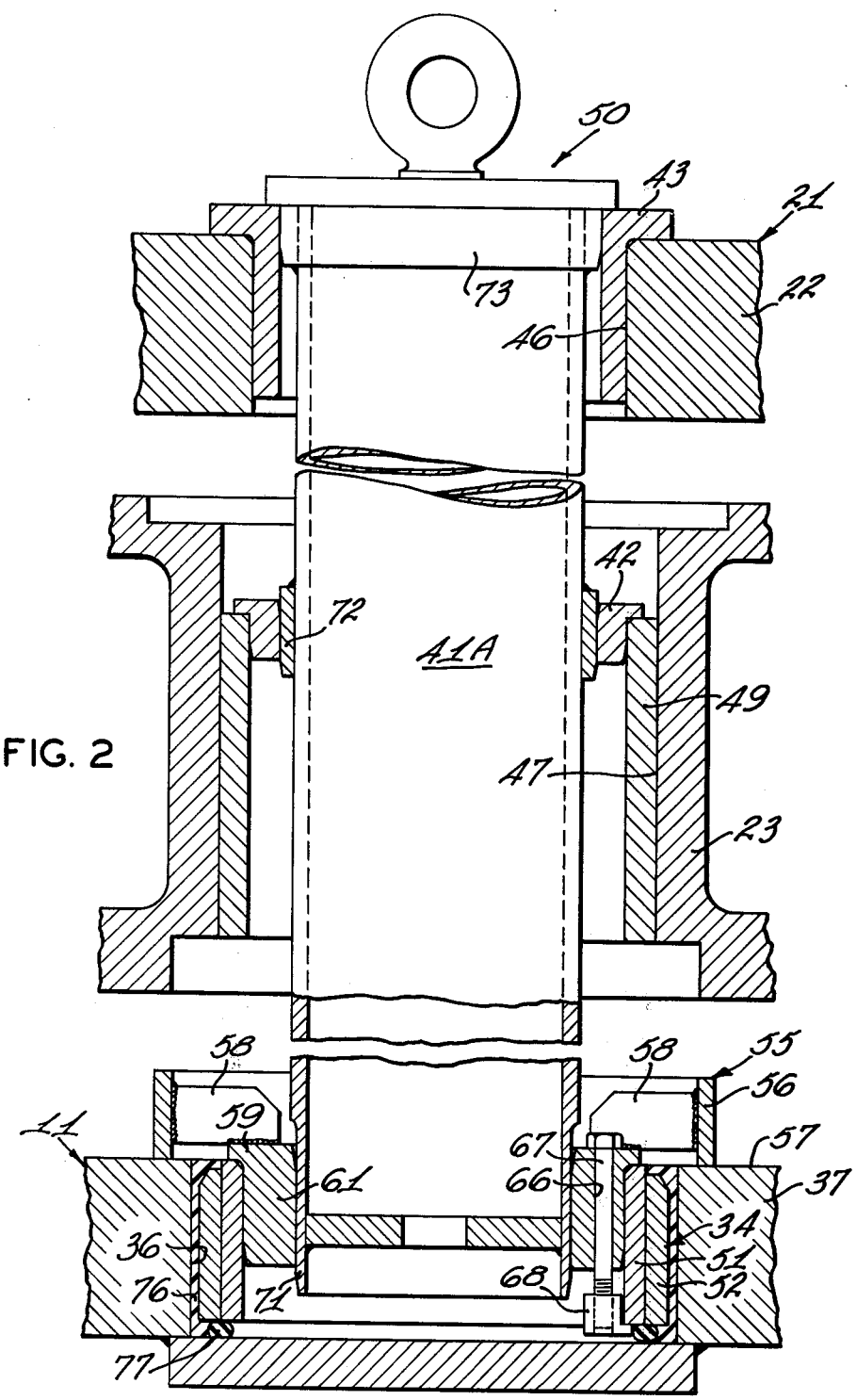

With the present invention, a near-as-possible perfect field alignment of the three bearings is possible. To this end, an apparatus 50 is provided to utilize the less critically sized location holes in the as manufactured stay ring-discharge ring 11 for the bushings. As shown in FIG. 2, the lowest bearing assembly 34 includes a bushing 51 and sleeve 52 which are attached or clamped to a lower bearing alignment fixture 55. The alignment fixture 55 includes a circular body member 56 of a diameter which is larger than the diameter of the stay ring-discharge ring opening 36 which has been previously rough bored or burned to good layout. Thus, the body member 56 will rest on the surface 57 of the bottom ring 37 and surround the opening 36. The lower bearing alignment fixture 55 includes a plurality of radially inwardly extending ribs 58, the ends of which are welded to the inner surface of the circular body member 56. At their inner ends, the ribs 58 rest upon and are welded to the top surface of a flanged head 59 of a pilot bushing 61. Thus, the pilot bushing 61 is supported in depending relationship by the circular body member 56 and is movable with it in all directions. As shown, the pilot bushing 61 engages in the bore of sleeve 51 which, in turn, is disposed within bushing 52.

As previously mentioned, the headcover 21 and the unitized stay ring-discharge ring 11 are manufactured at different times. This is true because the unitized stay ring-discharge ring 11 is an embedded component which is placed in the powerhouse foundation long before the headcover 21 is manufactured. Under this condition, it is impossible to assemble the two units 21 and 11 in the shop so as to line bore the openings 46, 47 and 36 together. It also must be remembered, while reference is herein being made to associated openings 46, 47 and 36, there are approximately 24 to 28 associated openings arranged in circular pattern relationship around the axis of the turbine shaft 28 to accommodate all of the necessary wicket gates 31. Thus, the openings 46 and 47 can be readily line bored during the manufacturing process of the headcover and the openings 36 will be bored or flame cut to a good layout separately. However, this presents a problem with effecting the aligning of the bearing assemblies.

To overcome this problem, the lower assembly 34 comprising the sleeve 51 and bushing 52 is securely clamped to the lower bearing assembly alignment fixture 55. To this end, the pilot bushing 61 is provided with a plurality of axially extending bores 66, in this instance, three, which are spaced equi-distant apart. In FIG. 2 only one of the bores 66 is shown. Each of the bores 66 receive a bolt 67 which extends below the end face of the bushing 61. A thumb clamp 68 is threadedly engaged on the lower extending threaded end of each of the bolts 67. The bushing and sleeve assembly 34 is clamped to the alignment fixture 55 by means of the bolt and thumb clamps so that the bushing and sleeve assembly 34 is movable radially in all directions with the fixture 55. With the bushing and sleeve assembly 34 clamped to the alignment fixture 55, it is placed in the opening 36. The intermediate bearing pilot 42 is inserted into the headcover opening 47 and is located in the sleeve 49 which has previously been inserted into the opening 47. An aligning bar 41A is inserted through the openings 46 and 47 to effect the engagement of the lower pilot end 71 of the bar within the lower bushing 61. With the pilot end 71 of bar 41A engaged in bushing 61 the bar 41A may be fully inserted so as to engage an intermediate bushing 42 and also to fully engage an upper pilot 73 in the upper bushing 43. This automatically effects the alignment of the bushing and sleeve assembly 34 with the two headcover bushings 42 and 43 at pilots 72 and 73, respectively.

With alignment obtained, a commercially available plastic steel compound is poured into the space 76 which exists between the outer surface of the bushing 52 and the surface of the lower bore or opening 36. To prevent the plastic steel compound from running out, a dam 77 of putty or an O-ring or the like is inserted below the bushing and sleeve assembly 34 as shown in FIG. 2. A plastic steel compound which has been found suitable is known as DEVCON PLASTIC STEEL "B" (pour type). This compound when set exhibits 18,000 P.S.I. Compression. When the compound has set and fixed the bearing assembly 34 in a position of alignment with the axis of the bar 41A, the alignment bar 41A is removed and the clamps 68 released. Thereafter, the alignment fixture 55 can be removed. The upper surface of the compound may be finished off, flush with the surface 57 by grinding.

From the foregoing description of a preferred alignment arrangement, it is apparent that an extremely simple yet effective means has been provided for aligning a bearing assembly which is located in a previously bored opening in one member with other bearing assemblies that have been constructed in another member at a different time.

The embodiments of the invention in which an exclusive property or privilege is claimed are defined as follows:

1. A method for aligning bushings in two spaced openings, the bushings being inserted at different times, comprising:
   placing a bushing assembly which is desired to be located in the opening in a first member in substantially axial alignment with a bushing in the other opening;
   inserting a clamping fixture within the bushing assembly;
   clamping the bushing assembly to the clamping fixture;
   inserting an alignment bar through the bushing in the opening in the second member and into the clamping fixture to effect radial movement of the clamping fixture and thereby align the bushing assembly clamped thereto with the axis of the aligning bar;
   fixing the bushing assembly in its aligned positioned within the opening in the first member.

2. A method of aligning a bushing assembly in an opening which is imprecisely formed in a first member with axial aligned bushings in openings in a second member comprising the steps of:
   placing a bushing in an approximate location within the opening in the first member;
   placing a movable releasable guide fixture having an opening around the opening in the first member;
   releasably securing said bushing to the radially movable guide fixture in axial alignment therewith;
   inserting an alignment bar through the bushings in the openings of the second member into engagement in the opening of the guide fixture to effect radial movement of the guide fixture and the bushing secured thereto and thereby effect the axial alignment of the bushing with the axis of the alignment bar and thereby the axes of the bushings of the second member through which the guide fixture passes;
   securing the axially aligned bushing of the first member in the located position;
   releasing the bushing from the guide fixture and removing the alignment bar and guide fixture.

3. The method of claim 2 wherein the step of securing the located bushing in the first member includes filling the space between the external surface of the bushing and the bore of the opening in the first member with a pourable, settable material and setting said material.

4. An apparatus for aligning a bushing assembly in an opening which is imprecisely formed in a first member with respect to the axis of the bores of at least two spaced apart bushings disposed in openings formed in a second member;

a guide fixture having a bore movably positioned on the first member and around the opening therein;

a bushing assembly for positioning in the opening in the first member;

releasable securing means carried by said guide fixture and operable when actuated to effectively secure said bushing assembly in axial alignment with the bore of said guide fixture; and, an alignment bar of a diameter to snugly fit within the bearings carried by second member and engageable in the bore of said guide fixture to effect a radial movement of said guide fixture and the bushing assembly secured thereto to effect the positioning of said bushing assembly within the opening of the first member with axis of said bushing assembly being in alignment with the axes of the bushings in the second member.

5. Apparatus according to claim 4 wherein said guide fixture includes a depending circular member having a bore adopted to receive the end of said alignment bar, said depending member having an O.D. to snugly fit within the bore of said bushing assembly.

6. Apparatus according to claim 5 wherein said depending circular member is provided with an outwardly extending radial head flange which abut the upper end of said bushing assembly;

a plurality of bores formed in the wall of said depending circular member;

a bolt disposed with each of said bores, the ends of said bolts being threaded, and extending outwardly of the associated bores; and, a thumb clamp threadedly engaged on the threaded extending ends of each of said bolts and engageable with said bushing assembly;

whereby upon actuation of said bolts in one direction said thumb clamps engage with the lower end of said bushing assembly to effect a clamping of said bushing assembly between said thumb clamps and the radially extending head flange of said depending circular member.

7. Apparatus according to claim 6 wherein there is provided means to fill the space between the O.D. of said bushing assembly and the bore of said opening in said first member and operable to secure said bushing assembly in its axial aligned position in the first member.

* * * * *